(No Model.)
F. A. HOUCK.
EGG BEATER.
No. 355,170. Patented Dec. 28, 1886.
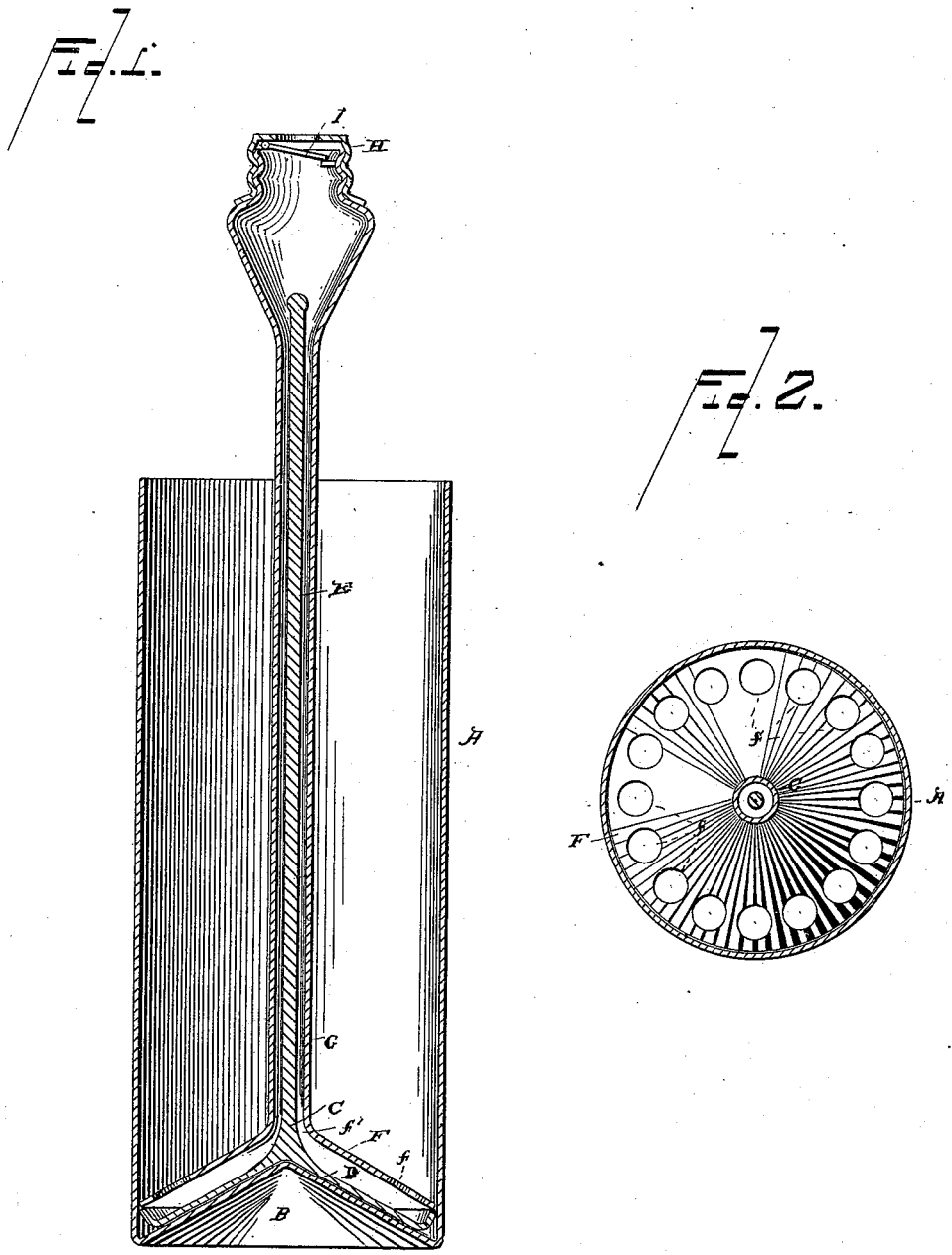
Witnesses
Geo. Thorpe
J. W. Garner
Inventor
Frank A. Houck
By his Attorneys

UNITED STATES PATENT OFFICE.

FRANK A. HOUCK, OF HOLDEN, MISSOURI.

EGG-BEATER.

SPECIFICATION forming part of Letters Patent No. 355,170, dated December 28, 1886.

Application filed July 29, 1886. Serial No. 209,454. (No model.)

*To all whom it may concern:*

Be it known that I, FRANK A. HOUCK, a citizen of the United States, residing at Holden, in the county of Johnson and State of Missouri, have invented a new and useful Improvement in Egg-Beaters, of which the following is a specification.

My invention relates to an improvement in egg-beaters; and it consists in the peculiar construction and combination of devices that will be more fully set forth hereinafter, and particularly pointed out in the claims.

In the drawings, Figure 1 is a vertical sectional view of an egg-beater embodying my improvements. Fig. 2 is a horizontal sectional view of the same.

A represents a vertical cylindrical vessel, the bottom of which is cone-shaped, as at B. The upper side of the vessel is open.

C represents a lifter comprising a conical plunger, D, which is made of sheet metal, and has its outer edges turned upwardly, and a vertical rod, E, the lower end of which is attached to the apex of the cone. The said lifter is adapted to fit in the vessel A, and rests upon the conical bottom thereof.

F represents a conical dasher, which is made of sheet metal and corresponds in diameter to the interior diameter of the vessel A. The said dasher F is provided near its outer edge with a series of openings, $f$, and at the center of the said dasher, at the apex thereof, is an opening, $f'$, which communicates with the lower end of the hollow dasher-rod G, which extends from the upper side of the vessel. To the upper end of the dasher-rod G is attached a case, H, in which is located a downwardly-opening valve, I.

The operation of my invention is as follows: The lifter is first placed in the bottom of the vessel A and the eggs to be beaten are poured in the said vessel upon the lifter. The dasher F is then placed in the vessel A, and the vertical rod or handle of the lifter extends up into the hollow dasher-rod G. The dasher is then worked up and down in the vessel A. On each downstroke of the dasher air is forced from the under side thereof through the eggs, and the eggs are beaten between the conical lifter and the conical dasher and forced upwardly through the openings $f$ in the latter, thus effecting a maximum agitation of the eggs and thoroughly aerating them. On each upstroke of the dasher the valve I descends, thereby admitting air into the hollow dasher-rod, which is forced through the eggs at the next downstroke of the dasher, as before described.

An egg-beater thus constructed is extremely cheap and simple, and is adapted to thoroughly beat the eggs in a very short space of time.

When the eggs have been beaten sufficiently, the dasher is first removed and the vessel A is then inclined over the dish or vessel into which the eggs are to be poured, and the lifter is then withdrawn from the vessel A by pulling upon the rod E. As the lifter fits snugly in the vessel A, it will be understood that upon withdrawing the lifter the vessel A will be entirely emptied of its contents.

I am aware that it has been heretofore proposed to provide a churn with a vertically-movable perforated dasher, having a rod extending through the cover of the churn, and a perforated butter lifter or disk under the dasher, and having a rod passing up through an opening in the churn-cover; but such is not my construction, and this I disclaim.

Having thus described my invention, I claim—

1. In an egg-beater, the combination of the vessel A, the lifting disk or plunger located therein, and provided with the rod or handle by means of which the said disk or plunger may be withdrawn from the vessel, and the dasher having the hollow tube or dasher-rod, through which the rod or handle of the lifter extends, the said hollow dasher-rod being provided with a downwardly-opening valve, by means of which air is forced from the under side of the dasher at each downstroke thereof, for the purpose set forth, substantially as described.

2. The combination of the vessel A, the conical lifting disk or plunger fitting therein, and having the rod or handle, by means of which the said lifting disk or plunger may be removed from the vessel A, and the conical dasher having the openings $f$, the hollow dasher-rod to receive the rod or handle of the lifter, and provided with the inwardly-opening valve I, for the purpose set forth, substantially as described.

In testimony that I claim the foregoing as my own I have hereto affixed my signature in presence of two witnesses.

FRANK A. HOUCK.

Witnesses:
 GEO. H. SAWS,
 SETH B. BRADLEY.